United States Patent
Bartol

(10) Patent No.: US 10,383,313 B2
(45) Date of Patent: Aug. 20, 2019

(54) DOG HARNESS WITH A SAFETY ATTACHMENT

(71) Applicant: Josef Bartol, Lakewood, NJ (US)

(72) Inventor: Josef Bartol, Lakewood, NJ (US)

( * ) Notice: Subject to any disclaimer, the term of this patent is extended or adjusted under 35 U.S.C. 154(b) by 0 days.

(21) Appl. No.: 14/637,422

(22) Filed: Mar. 4, 2015

(65) Prior Publication Data

US 2015/0250146 A1  Sep. 10, 2015

Related U.S. Application Data

(60) Provisional application No. 61/949,104, filed on Mar. 6, 2014.

(51) Int. Cl.
*A01K 27/00* (2006.01)

(52) U.S. Cl.
CPC .......... *A01K 27/002* (2013.01); *A01K 27/005* (2013.01); *A01K 27/006* (2013.01)

(58) Field of Classification Search
CPC ... A01K 27/002; A01K 27/006; A01K 27/005
USPC .......................................... 119/792, 856, 859
See application file for complete search history.

(56) References Cited

U.S. PATENT DOCUMENTS

| | | | | |
|---|---|---|---|---|
| 1,800,421 A * | 4/1931 | Wickersham | ........ | A01K 27/002 119/863 |
| 2,187,021 A * | 1/1940 | Everson | ................ | A01K 27/002 119/792 |
| 2,605,744 A * | 8/1952 | Urbanski | ............. | A01K 27/002 119/856 |
| 2,652,649 A * | 9/1953 | Kobert | ................... | A01M 31/00 119/907 |
| 2,826,172 A * | 3/1958 | Buckle | ................... | A01K 15/04 119/792 |
| 3,641,984 A * | 2/1972 | Lanus | ................... | A01K 27/001 119/863 |
| 3,768,445 A * | 10/1973 | Sorrels | ................. | A01K 27/002 119/856 |
| 3,872,529 A * | 3/1975 | Wainwright | ............ | B63C 11/26 116/173 |
| 5,199,383 A * | 4/1993 | Lagana | ................ | A01K 27/002 119/858 |
| 5,291,856 A * | 3/1994 | Goller | ................... | A01K 27/003 119/795 |
| 5,775,970 A * | 7/1998 | Klees | .................... | A01K 27/006 119/792 |
| 6,557,498 B1 * | 5/2003 | Smierciak | ............ | A01K 27/006 119/858 |

(Continued)

OTHER PUBLICATIONS http://vcahospitals.com/texas-corners/know-your-pet/behavior-modification--ttouchr. Behavior Modification—TTouch (r) by Debra Horwitz, DVM, DACVB & Gary Landsberg, DVM, DACVB, DECAWBM Behavior, Pet Services (Year: 2012).*

*Primary Examiner* — Joshua D Huson
(74) *Attorney, Agent, or Firm* — Berenato & White, LLC

(57) ABSTRACT

There is provided a restraining device with a safety attachment for walking a dog, the device having a harness and an extension pole, wherein the pole is rigid and is attached to said harness at its proximal end, and is attachable to a leash on its distal end.

The rigid extension pole extends substantially vertically above the dog and keeps the leash away from the dog's body, thereby preventing the leash from becoming entangled with the dog's legs.

17 Claims, 8 Drawing Sheets

(56) References Cited

U.S. PATENT DOCUMENTS

| | | | | |
|---|---|---|---|---|
| 6,694,923 | B1* | 2/2004 | Fouche | A01K 27/005 |
| | | | | 119/792 |
| 7,004,114 | B2* | 2/2006 | Hippensteel | A01K 27/003 |
| | | | | 119/792 |
| 7,021,246 | B2* | 4/2006 | Seymour | A01K 13/006 |
| | | | | 119/850 |
| 8,413,670 | B1* | 4/2013 | Richardson, Jr. | A01K 13/006 |
| | | | | 119/792 |
| 9,376,183 | B2* | 6/2016 | Cannici | B63C 9/21 |
| 2005/0145202 | A1* | 7/2005 | Bonner | A01K 27/002 |
| | | | | 119/792 |
| 2006/0102105 | A1* | 5/2006 | Sohler | A01K 27/005 |
| | | | | 119/858 |
| 2008/0223310 | A1* | 9/2008 | Remick | A01K 27/002 |
| | | | | 119/792 |
| 2008/0276880 | A1* | 11/2008 | Swisher | A01K 27/002 |
| | | | | 119/728 |
| 2008/0289586 | A1* | 11/2008 | O'Connor | A01K 13/006 |
| | | | | 119/850 |
| 2010/0077967 | A1* | 4/2010 | Matusak | A01K 15/04 |
| | | | | 119/758 |
| 2010/0277945 | A1* | 11/2010 | Hurwitz | A01K 13/003 |
| | | | | 362/570 |
| 2014/0251235 | A1* | 9/2014 | Codos | A01K 27/002 |
| | | | | 119/792 |

* cited by examiner

DOG HARNESS WITH A SAFETY ATTACHMENT

The present invention relates generally to accessories for controlling animals, and more particularly to animal walking devices.

BACKGROUND OF THE INVENTION

Every dog owner owns a leash, or a harness which connects to a leash, for use when walking their dog outside. Often while walking the dog, it will slow its pace or stop walking altogether or change directions, and then step on the leash or its legs will become entangled with the leash. This problem is widely known and has a physically straining effect when dealing with the untangling of the leash. The safety of the dog is also compromised, if the leash becomes tangled with its legs while crossing the street.

There is a need to find a solution for the above problem, and provide safety and convenience for dogs and their owners.

SUMMARY OF THE INVENTION

Accordingly, it is a principal object of the present invention to overcome the disadvantages associated with existing dog harnesses and provide a solution for safely walking and guiding a dog and preventing entanglement of a dog's legs with a leash.

In accordance with a principal object of the present invention, there is provided a restraining device with a safety attachment for walking a dog, the device having:

a harness; and an extension pole, where said pole is rigid and is attached to the harness at its proximal end, and is attachable to a leash on its distal end;

where the rigid extension pole extends substantially vertically above the dog and keeps the leash away from the dog's body, thereby preventing the leash from becoming entangled with the dogs legs.

In a preferred embodiment of the present invention, there is provided an inventive restraining device featuring a dog harness with a safety attachment with the harness having buckles beneath the dog. The safety attachment is provided as a rigid linear extension pole and is fixedly connected at its proximal end to a rigid flat component having rectilinear shape defined by edges, which is connected to the harness. Rigid extension pole extends substantially vertically above the dog, so that the leash which is connected to the extension pole is kept away from the dog's body, high above it, thereby preventing any slack in the leash, so that it does not become entangled in the dog's legs.

The geometric shape and angle at which the extension pole extends from the rigid flat component may be variable, and within a range so as to avoid entangling of the leash with the dog's legs, and taking into account factors such as dog size or type, and other factors such as working tasks or loads the dog must bear.

The rigid extension pole may be made of silicone, plastic, rubber material, or any other suitable material, and may have a wire embedded in it for added rigidity, or may be constructed as a coiled spring.

In an alternative embodiment of the present invention, there is provided an inventive restraining device featuring a dog harness with a safety attachment with the harness having buckles on the dog's back. This embodiment enables the dog owner to attach the restraining device to its dog by using only one hand, while the other hand is available to hold the dog.

It would be appreciated that the term "dog owner" includes a dog handler or any other person controlling the dog's movement.

In a further alternative embodiment of the present invention, there is provided an inventive restraining device featuring a dog harness with a safety attachment with the harness having hooks.

In another alternative embodiment of the present invention, there is provided an inventive restraining device featuring a dog harness with a safety attachment, having LED lights, or glow-in-the-dark material, or it may have reflective capabilities.

It will be appreciated that the inventive restraining device may be used with other animals that have to be led by a leash.

Other features and advantages of the invention will become apparent from the following drawings and description.

BRIEF DESCRIPTION OF THE DRAWINGS

For a better understanding of the invention with regard to the embodiments thereof, reference is made to the accompanying drawings, in which like numerals designate corresponding elements or sections throughout, and in which.

DETAILED DESCRIPTION OF THE DRAWINGS

Figure 1:
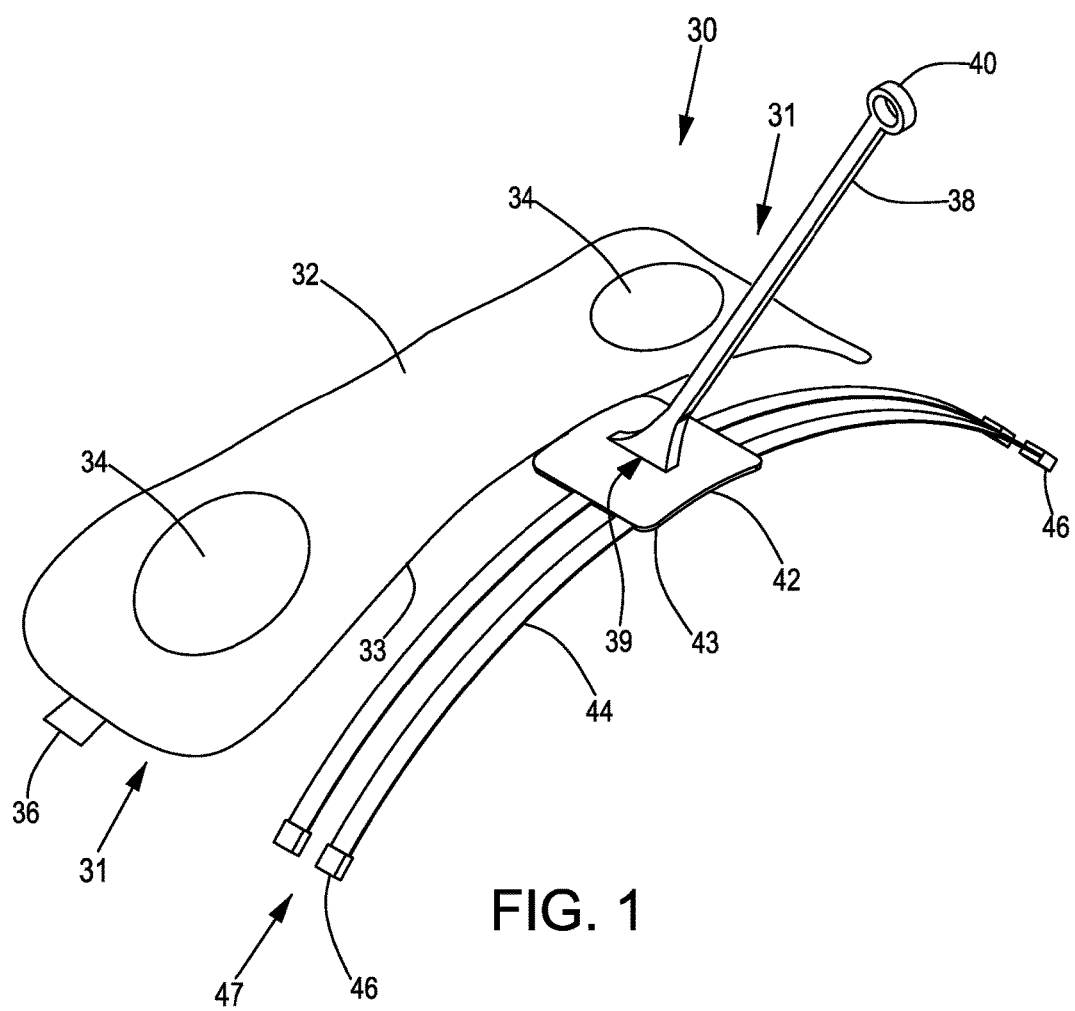
FIG. 1 shows show a rear perspective view of the inventive restraining device featuring a dog harness with a safety attachment, with the harness having buckles beneath the dog.

Referring now to FIG. 1, there is shown a perspective view of a dog restraining device 30 having a safety attachment 38 constructed and operated in accordance with the principles of the present invention.

Harness 32 is wrapped around the dog's stomach and back by inserting the dog's front legs through openings 34, and securing a pair of buckles 36 (both shown in FIG. 3) beneath the dog. Buckle 36 may be made of Velcro or any other appropriate type of buckle, and is located on either end 31 of harness 32. Safety attachment 38 is provided as a rigid linear extension pole and is fixedly connected at its proximal end to a rigid flat component 42 providing a base. Flat component 42 has rectlinear-shaped edges 43 and is attached to and extends from the rear edge 33 of harness 32. Rigid extension pole 38 extends from connection point 39 vertically above the dog, and does not bend sideways. Straps 44 having fasteners 46 at each of its ends 47, extend from both sides of component 42 and are wrapped around the dog and secured to each other beneath the dog.

The dimension of harness 32 may be adapted to be suitable for various dog sizes.

Figure 4A:
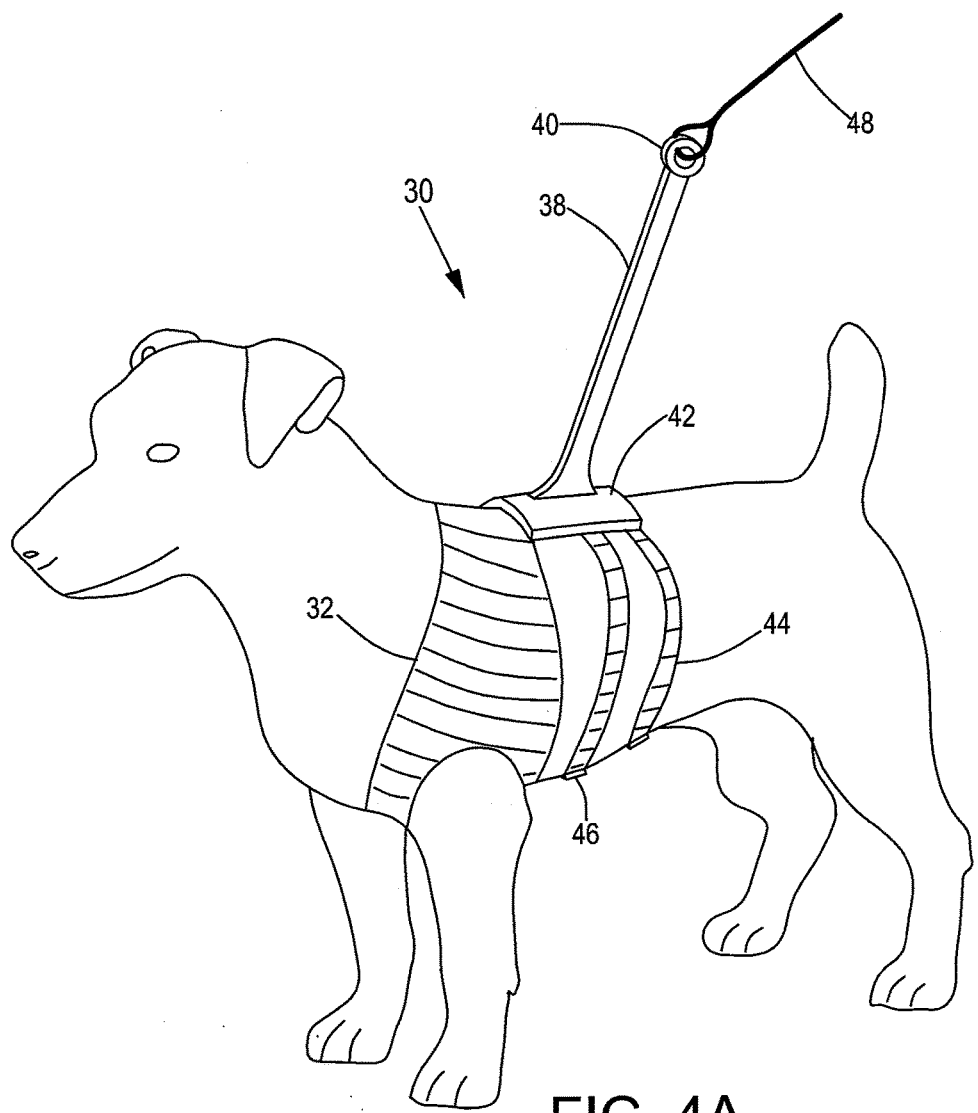
FIGS. 4A-C show a dog wearing the harness of FIG. 1.
Figures 4B, 4C:
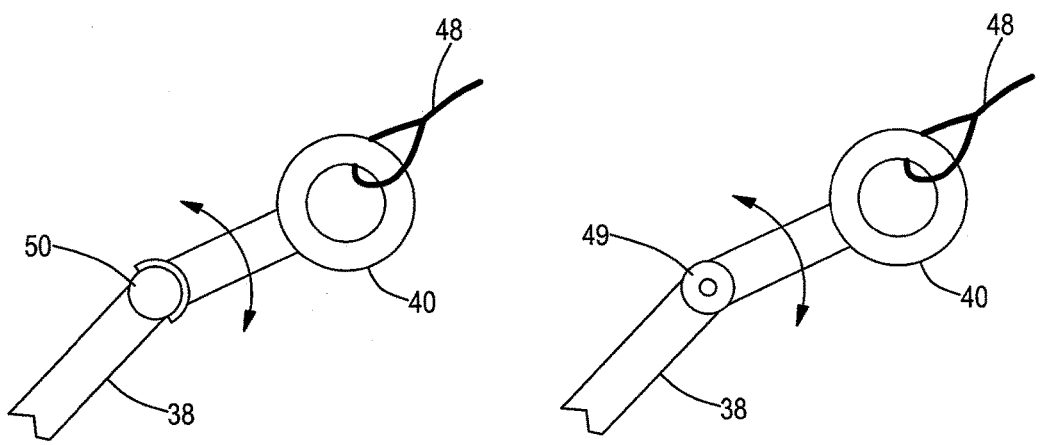

Rigid extension pole 38 is made of silicone, plastic, rubber material, or any other resilient, light-weight material that will allow both rigidity and flexibility, to ensure that the pole remains oriented vertically to the dog, and for ensuring that the pole remains intact even when the dog pulls violently on the leash connected to the pole (shown in FIGS. 4A-C). Rigid extension pole 38 may have a wire embedded in it for added rigidity, or may be constructed as a coiled spring.

Figure 2:
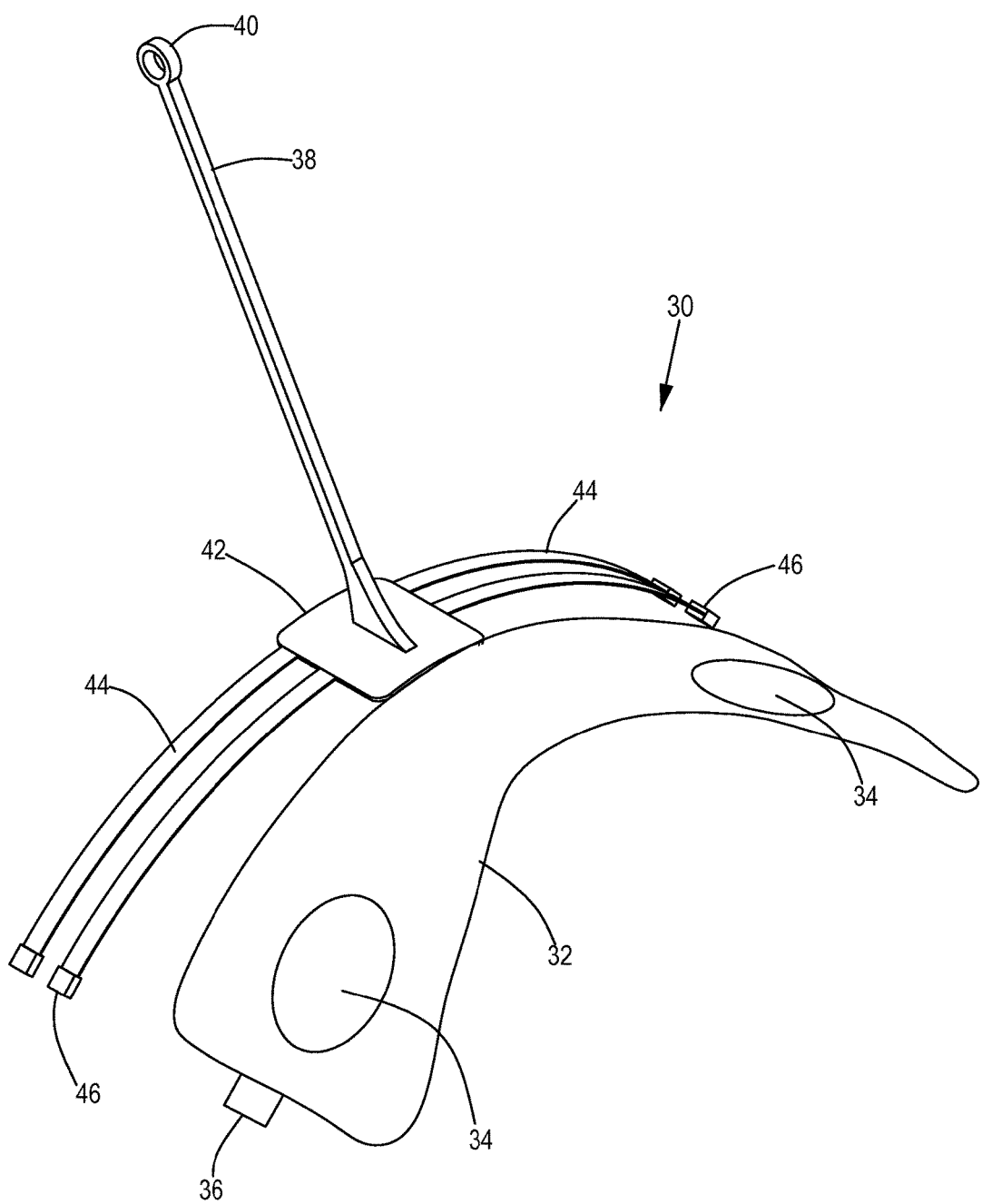
FIG. 2 shows a front perspective view of the dog harness of FIG. 1.

Referring now to FIG. 2, there is shown a front perspective view of the dog restraining device 30 of FIG. 1.

Figure 3:
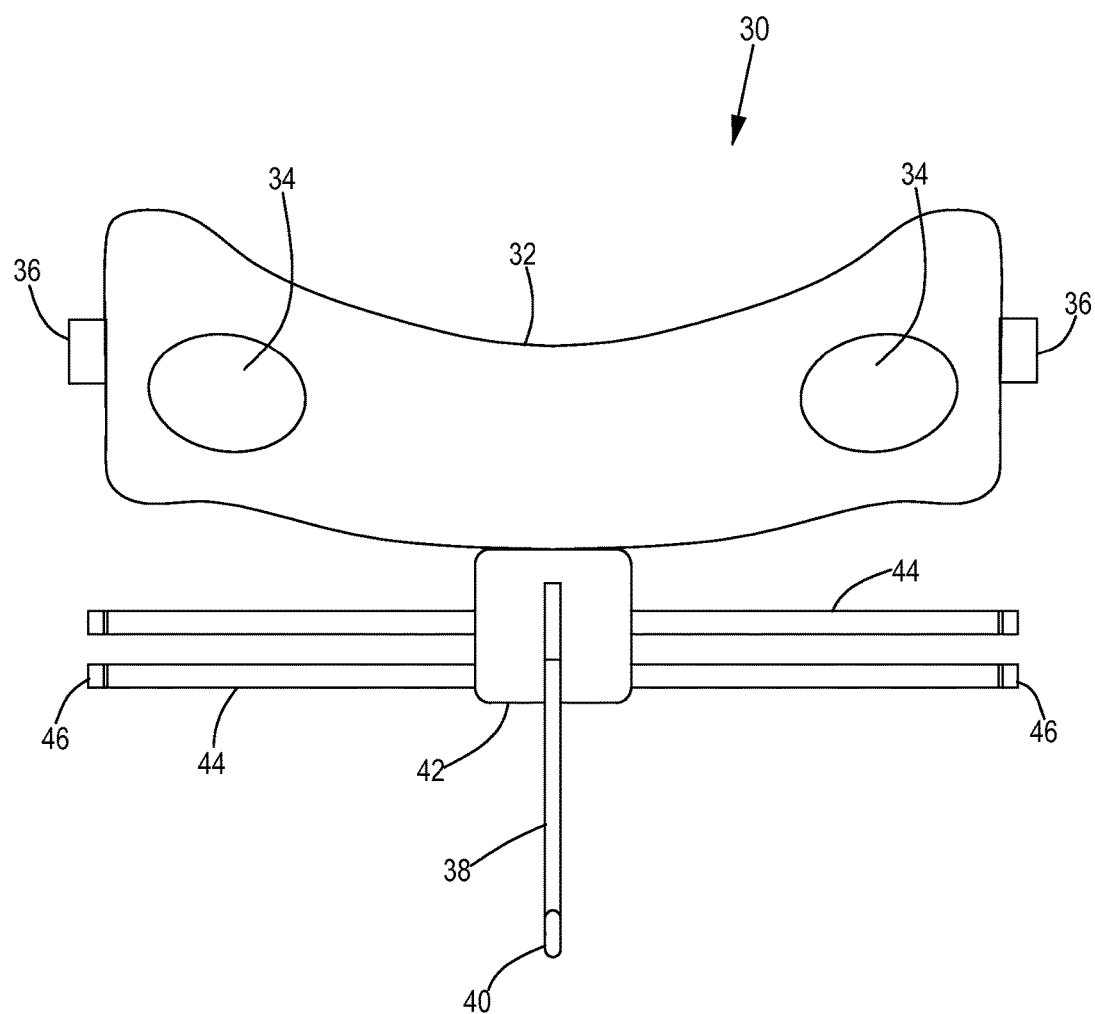
FIG. 3 shows a top view of the harness of FIG. 1.

Referring now to FIG. 3, there is shown a top view of the dog restraining device 30, showing buckles 36, one on either side of harness 32.

Referring now to FIGS. 4A-C, there is shown a dog wearing dog restraining device 30, after it has been placed on the dog, and secured using buckles 36 and fasteners 46. Flat component 42 is shown positioned on the dog's back, with extension pole 38 extending vertically therefrom above the dog. Leash 48 is connected to extension pole 38 via loop 40 formed at the distal end of pole 38. In this manner, leash 48 is kept away from the dog's body so that it does not become entangled in the dog's legs, thereby ensuring the dog's safety and adding convenience to the dog owner. Dogs are often agitated by the leash and tend to grab it with their teeth, so the extension pole 38 keeps the leash away from the dog's mouth so that it is not able to grab it with its teeth.

As shown, extension pole 38 may have a pivot 49 or a bearing 50 at its distal end for attaching a leash thereto, for added comfort and maneuverability. A bearing 50 or pivot 49 will ensure that the extension pole will not snap under quick movement changes of the dog.

Figure 5:
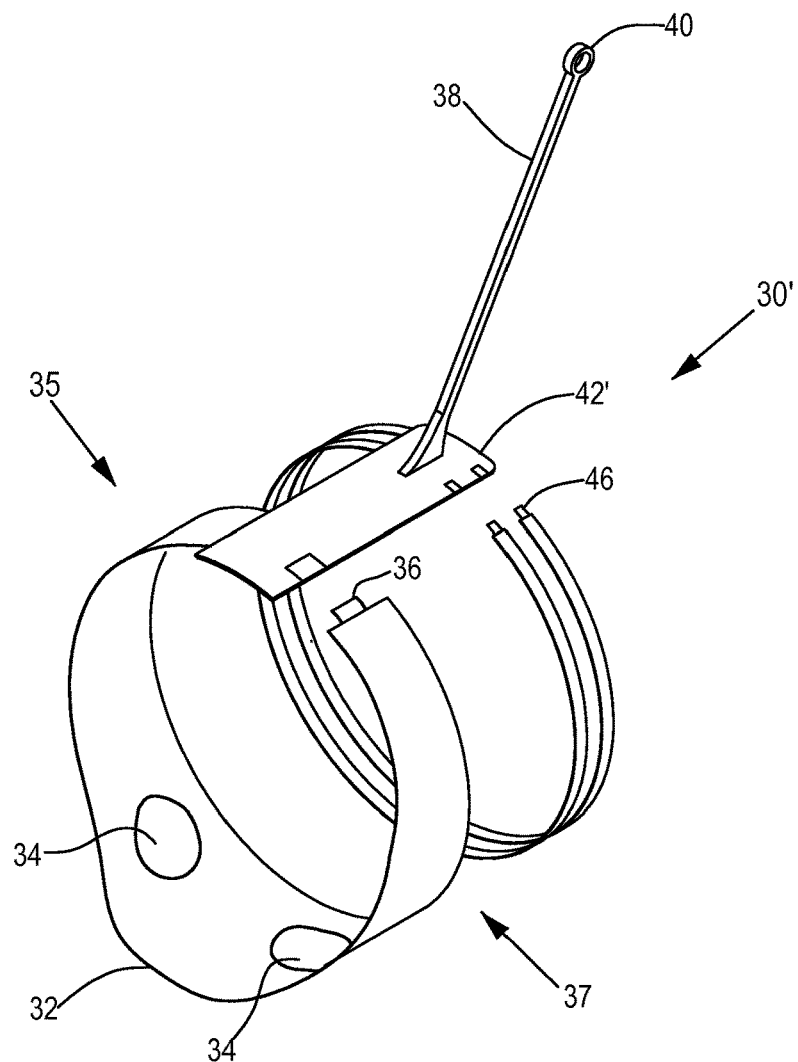
FIG. 5 shows an alternative embodiment of the dog harness with a safety attachment, with the harness having the buckles on the dog's back.

Referring now to FIG. 5, there is shown an alternative embodiment of the dog restraining device 30, denoted as 30'. In this embodiment, flat component 42' is shown elongated and is permanently attached to one side 35 of harness 32, while the other side 37 of harness 32 can be attached to and detached from flat component 42' via buckle 36. This embodiment enables the dog owner to attach restraining device 30' to its dog by using only one hand, while the other hand is available to hold the dog.

Figure 6:
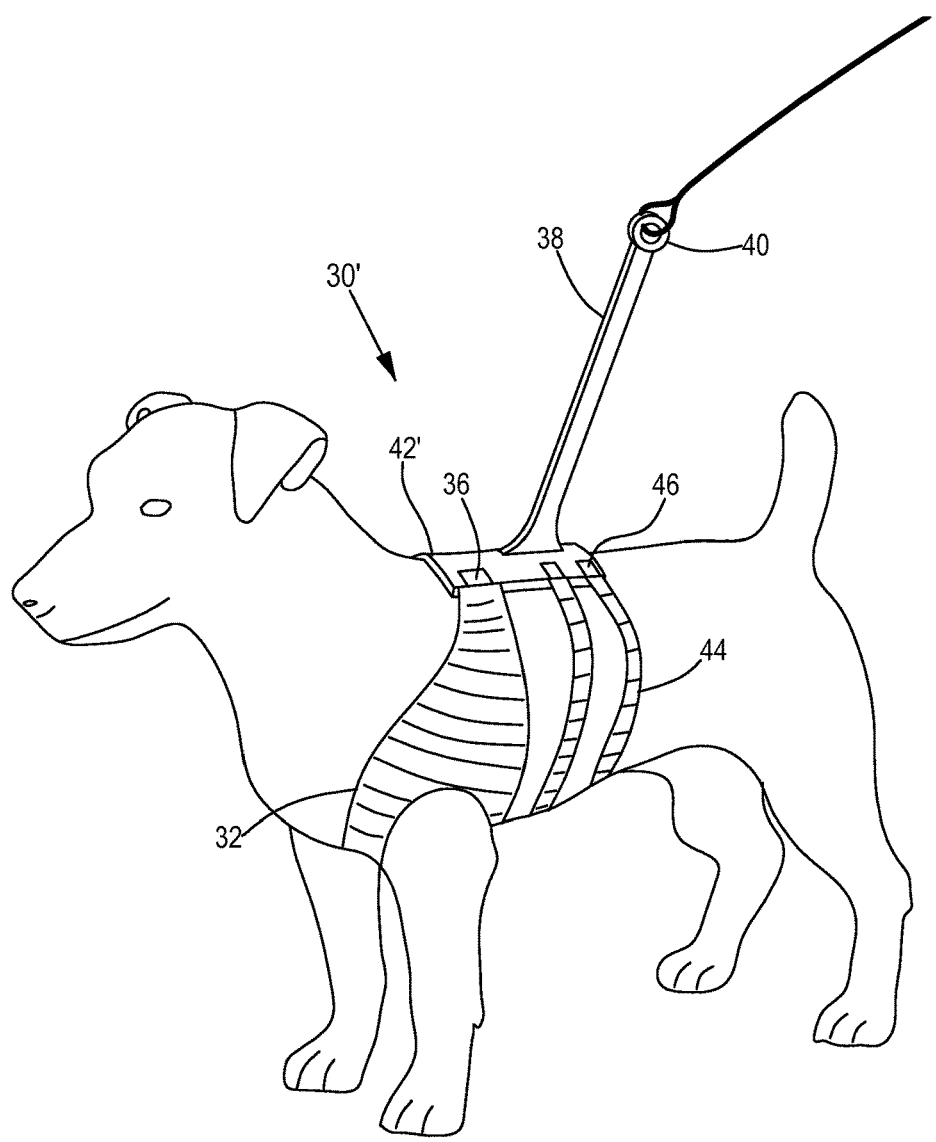
FIG. 6 shows a dog wearing the harness of FIG. 5.

Referring now to FIG. 6, there is shown a dog wearing restraining device 30', illustrating buckle 36 and fasteners 46 secured on the dog's back.

Figure 7:
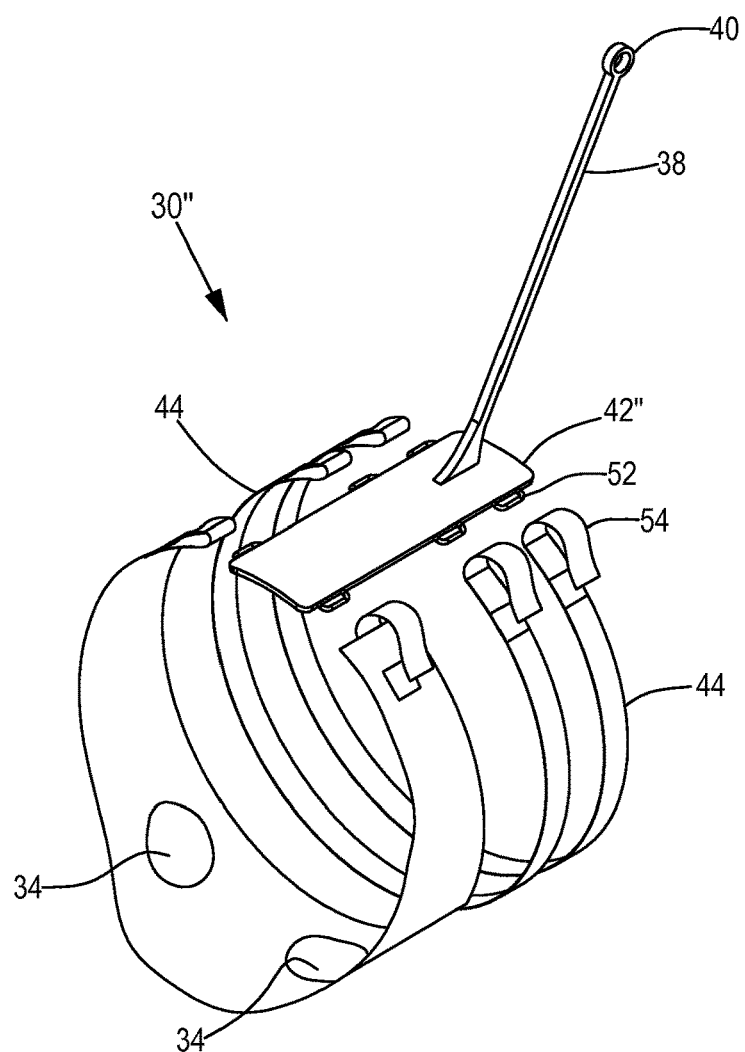
FIG. 7 shows a further alternative embodiment of the dog harness with a safety attachment, with the harness having hooks.

Referring now to FIG. 7, there is shown a further alternative embodiment of the dog restraining device 30, denoted 30". Flat component 42" is elongated and has multiple anchor points 52 along both its sides. Hooks 54 are provided at both ends 31 of harness 32 and the ends 47 of straps 44 for securely connecting to anchor points 52.

Figure 8:
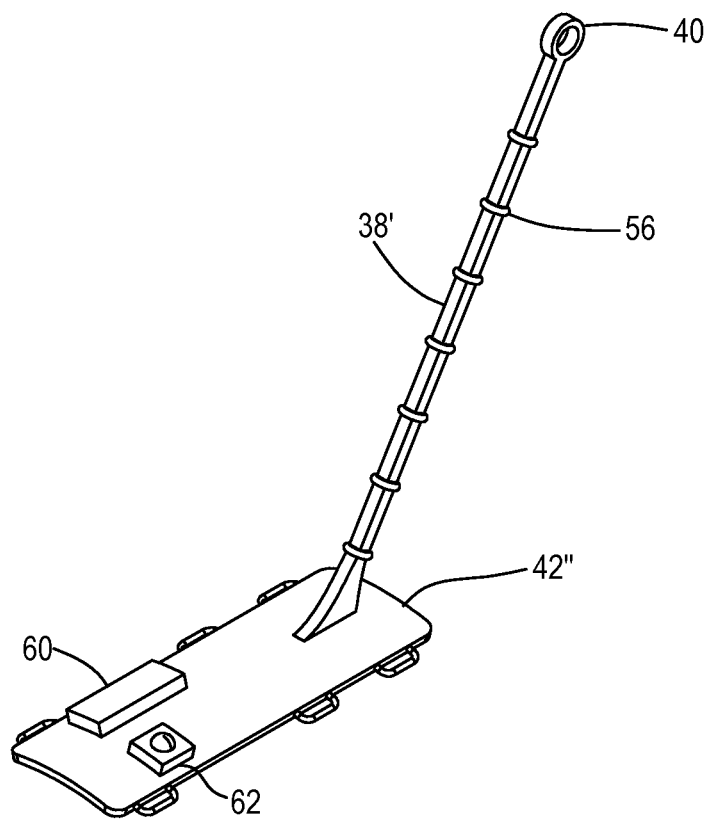
FIG. 8 shows part of another alternative embodiment of a dog harness with a safety attachment, having LED lights.

Referring now to FIG. 8, there is shown extension pole 38' having multiple LED lights 56 disposed along its length. Flat component 42" has installed thereon a battery 60 and a light sensor 62. Light sensor 62 senses the sunlight, so that when the sun goes down, LED lights 56 are automatically turned on.

Instead of LED lights there may be glow-in-the-dark materials or rigid pole 38 may have reflective capabilities.

Dog restraining device 30 may be designed so that harness 32 and/or extension pole 38 have the appearance of a figurine. This may include an animal shape or an entertaining motif or shape, without compromising functionality. This may also include themes and designs that add playfulness to device 30.

Although particular embodiments of the invention have been described and illustrated herein, it is recognized that modifications and variations may readily occur to those skilled in the art and consequently, it is intended that the claims be interpreted to cover such modifications and equivalents.

I claim:

1. A dog training harness apparatus providing an integral, anti-tangle safety device for a handler walking a dog, said harness apparatus comprising:

a restraining harness located on the dog's back, said restraining harness having a self-contained rigid, linear extension pole with a cross-sectional pole thickness, wherein said rigid linear extension pole is joined at its proximal end via a connection point to a rigid flat component integrally formed therewith, attached to said harness, said rigid linear extension pole having universal attachment means at its distal end being attachable to any leash, the harness having no attachment means located thereon for a leash, wherein said universal attachment means at said distal end of said rigid extension pole comprises a loop and at least one of a pivot and bearing arranged to provide added comfort and maneuverability of the attached leash upon development of leash tension, thereby ensuring that said rigid extension pole will not snap under quick movement changes of the dog, wherein said rigid flat component is integrally molded as one-piece with said rigid extension pole and has a width substantially greater than said cross-sectional pole thickness, said rigid flat component having straps extending from both sides thereof and being wrapped around the dog's body and secured to each other beneath the dog, said rigid flat component providing a base having rectilinear-shaped edges defining a contact area against the dog's back, said rigid flat component thereby providing via said base contact area, distribution of said leash tension, upon directional leash tension transmitted via said rigid linear extension pole, whereby said leash tension transmits directional pressure directly to the dog's back at said base contact area via said connection point, so as to facilitate touch-based communication between the handler and the dog, and wherein said rigid linear extension pole extends substantially vertically and rearwardly above the dog at an angle less than 90 degrees relative to said rigid flat component, and keeps the attached leash away from the dog's body, thereby preventing the attached leash from becoming entangled with the dog's legs.

2. The apparatus of claim 1, wherein said harness comprises:

openings for inserting the dogs legs therein; and a buckle located on two ends of said harness, wherein said buckles are secured beneath the dog.

3. The apparatus of claim 1, wherein said rigid flat component is attached to and extends from the rear edge of said harness.

4. The apparatus of claim 3, wherein said rigid flat component further comprises at least one strap extending from each of both sides thereof, and wherein said straps have a fastener at each of their ends and are secured to each other beneath the dog.

5. The apparatus of claim 1, wherein said rigid flat component is elongated and one side thereof is permanently attached to one side of said harness and to one end of a strap, with the other side of said harness being attachable to the other side of said rigid flat component via a buckle, and with the other end of said strap being attachable to said rigid flat component via a fastener, thereby enabling a dog owner to attach said restraining device to the dog by using only one hand to close said buckle and said fastener, while the other hand is available to hold the dog.

6. The apparatus of claim 5, wherein said buckle and straps are secured on the dog's back.

7. The apparatus of claim 1, wherein said harnesses dimensions may be adapted to be suitable for various dog sizes.

8. The apparatus of claim 1, wherein said extension pole is made of a material selected from the group of silicone, plastic, rubber material, or any other resilient, light-weight material that will allow both rigidity and flexibility, to ensure that said extension pole remains oriented substantially vertically to the dog, and for ensuring that said pole remains intact even when the dog pulls violently on the leash connected to said extension pole.

9. The apparatus of claim 1, wherein said extension pole has a wire embedded in it for added rigidity.

10. The apparatus of claim 1, wherein said angle is within a range so as to avoid entangling of the leash with the dog's legs.

11. The apparatus of claim 1, wherein said extension pole comprises said loop at its distal end, and wherein said loop is attachable to the leash.

12. The apparatus of claim 1, wherein said rigid flat component is elongated and comprises multiple anchor points along both of its sides, and wherein the ends of said harness and ends of said strap comprise hooks to securely connect to said anchor points.

13. The apparatus of claim 1, wherein said extension pole comprises multiple LED lights disposed along its length, and wherein said rigid flat component comprises a battery installed thereon.

14. The apparatus of claim 13, wherein said rigid flat component further comprises a light sensor installed thereon, so that said LED lights will be automatically turned on when the sun goes down.

15. The apparatus of claim 1, wherein said extension pole comprises at least one of a light reflective material and glow-in-the-dark materials.

16. The apparatus of claim 1, wherein said extension pole comprises at least one of a figurine and a geometric shape.

17. A dog training harness apparatus providing a self-contained anti-tangle safety device for a handler walking a dog, said harness apparatus comprising:
a restraining harness located on the dog's back;
a rigid flat component attached to said harness at a rear edge thereof; and
a rigid extension pole with a cross-sectional pole thickness, wherein said extension pole is attached to said rigid flat component at its proximal end, said rigid extension pole having universal attachment means at its distal end being attachable to any leash, the harness having no attachment means located thereon for a leash,
wherein said universal attachment means at said distal end of said rigid extension pole is arranged to provide added comfort and maneuverability of the attached leash during motion, thereby ensuring that said rigid extension pole will not snap under quick movement changes of the dog,
wherein said rigid extension pole is joined at a connection point to said rigid flat component at its proximal end, said rigid flat component being integrally molded as one-piece with said rigid extension pole and having a width substantially greater than said cross-sectional pole thickness,
said rigid flat component having straps extending from both sides thereof and being wrapped around the dog's body and secured to each other beneath the dog,
said rigid flat component providing a base having rectilinear-shaped edges defining a contact area against the dog's back,
said rigid flat component thereby providing via said base contact area, distribution of said leash tension, upon directional leash tension transmitted via said rigid extension pole,
whereby said leash tension transmits directional pressure directly to the dog's back at said base contact area via said connection point, so as to facilitate touch-based communication between the handler and the dog,
wherein said rigid extension pole extends substantially vertically and rearwardly above the dog at an angle less than 90 degrees relative to said rigid flat component, and keeps the attached leash away from the dog's body, thereby preventing the attached leash from becoming entangled with the dog's legs.

* * * * *